(12) United States Patent
Bilbrey et al.

(10) Patent No.: US 8,619,128 B2
(45) Date of Patent: Dec. 31, 2013

(54) SYSTEMS AND METHODS FOR AN IMAGING SYSTEM USING MULTIPLE IMAGE SENSORS

(75) Inventors: Brett Bilbrey, Sunnyvale, CA (US); Guy Cote, San Jose, CA (US)

(73) Assignee: Apple Inc., Cupertino, CA (US)

( * ) Notice: Subject to any disclaimer, the term of this patent is extended or adjusted under 35 U.S.C. 154(b) by 757 days.

(21) Appl. No.: 12/570,966

(22) Filed: Sep. 30, 2009

(65) Prior Publication Data

US 2011/0074931 A1    Mar. 31, 2011

(51) Int. Cl.
*H04N 13/02*    (2006.01)

(52) U.S. Cl.
USPC .......................................................... 348/48

(58) Field of Classification Search
USPC .......................................................... 348/48
See application file for complete search history.

(56) References Cited

U.S. PATENT DOCUMENTS

| | | | |
|---|---|---|---|
| 3,363,104 A | | 1/1968 | Waite et al. |
| 3,761,947 A | | 9/1973 | Volkmann et al. |
| 4,620,222 A | | 10/1986 | Baba et al. |
| 5,272,473 A | | 12/1993 | Thompson et al. |
| 5,274,494 A | | 12/1993 | Rafanelli et al. |
| 5,283,640 A | * | 2/1994 | Tilton ............................... 348/42 |
| 5,337,081 A | | 8/1994 | Kamiya et al. |
| 5,625,408 A | * | 4/1997 | Matsugu et al. ................. 348/42 |
| 5,748,199 A | * | 5/1998 | Palm .............................. 345/473 |
| 5,757,423 A | | 5/1998 | Tanaka et al. |
| 6,002,423 A | * | 12/1999 | Rappaport et al. ............... 348/42 |
| 6,043,838 A | * | 3/2000 | Chen ................................ 348/42 |
| 6,215,898 B1 | * | 4/2001 | Woodfill et al. ............... 382/154 |
| 6,282,655 B1 | | 8/2001 | Given |
| 6,310,662 B1 | | 10/2001 | Sunakawa et al. |
| 6,339,429 B1 | | 1/2002 | Schug |
| 6,389,153 B1 | | 5/2002 | Imai et al. |

(Continued)

FOREIGN PATENT DOCUMENTS

| | | |
|---|---|---|
| EP | 167314 | 1/1986 |
| EP | 2053844 | 4/2009 |

(Continued)

OTHER PUBLICATIONS

Author Unknown, "YCbCr," http://en.wikipedia.org/wiki/Y%27CbCr, 4 pages, at least as early as Jun. 17, 2010.

(Continued)

*Primary Examiner* — Moustafa M Meky
*Assistant Examiner* — Blake Rubin
(74) *Attorney, Agent, or Firm* — Brownstein Hyatt Farber and Schreck, LLP

(57) ABSTRACT

Systems and methods may employ separate image sensors for collecting different types of data. In one embodiment, separate luma, chroma and 3-D image sensors may be used. The systems and methods may involve generating an alignment transform for the image sensors, and using the 3-D data from the 3-D image sensor to process disparity compensation. The systems and methods may involve image sensing, capture, processing, rendering and/or generating images. For example, one embodiment may provide an imaging system, including: a first image sensor configured to obtain luminance data of a scene; a second image sensor configured to obtain chrominance data of the scene; a third image sensor configured to obtain three-dimensional data of the scene; and an image processor configured to receive the luminance, chrominance and three-dimensional data and to generate a composite image corresponding to the scene from that data.

14 Claims, 5 Drawing Sheets

(56) References Cited

U.S. PATENT DOCUMENTS

| | | |
|---|---|---|
| 6,416,186 B1 | 7/2002 | Nakamura |
| 6,516,151 B2 | 2/2003 | Pilu |
| 6,560,711 B1 | 5/2003 | Given et al. |
| 6,561,654 B2 | 5/2003 | Mukawa et al. |
| 6,614,471 B1 * | 9/2003 | Ott .................. 348/238 |
| 6,636,292 B2 | 10/2003 | Roddy et al. |
| 6,807,010 B2 | 10/2004 | Kowarz |
| 6,862,022 B2 | 3/2005 | Slupe |
| 6,877,863 B2 | 4/2005 | Wood et al. |
| 6,903,880 B2 | 6/2005 | Beatson et al. |
| 6,921,172 B2 | 7/2005 | Ulichney et al. |
| 6,924,909 B2 | 8/2005 | Lee et al. |
| 6,930,669 B2 | 8/2005 | Weiner et al. |
| 6,931,601 B2 | 8/2005 | Vronay et al. |
| 6,970,080 B1 | 11/2005 | Crouch et al. |
| 7,028,269 B1 | 4/2006 | Cohen-Solal et al. |
| 7,058,234 B2 | 6/2006 | Gindele et al. |
| 7,079,707 B2 | 7/2006 | Baron |
| 7,103,212 B2 * | 9/2006 | Hager et al. .................. 382/154 |
| 7,123,298 B2 | 10/2006 | Schroeder et al. |
| 7,307,709 B2 | 12/2007 | Lin et al. |
| 7,352,913 B2 | 4/2008 | Karuta et al. |
| 7,370,336 B2 | 5/2008 | Husain et al. |
| 7,413,311 B2 | 8/2008 | Govorkov et al. |
| 7,453,510 B2 | 11/2008 | Kolehmainen et al. |
| 7,460,179 B2 | 12/2008 | Pate et al. |
| 7,512,262 B2 | 3/2009 | Criminisi et al. |
| 7,551,771 B2 | 6/2009 | England |
| 7,567,271 B2 * | 7/2009 | Berestov .................. 348/48 |
| 7,570,881 B2 | 8/2009 | Perala et al. |
| 7,590,335 B2 | 9/2009 | Kobayashi et al. |
| 7,590,992 B2 | 9/2009 | Koplar et al. |
| 7,598,980 B2 | 10/2009 | Imai et al. |
| 7,613,389 B2 | 11/2009 | Suzuki et al. |
| 7,629,897 B2 | 12/2009 | Koljonen |
| 7,641,348 B2 | 1/2010 | Yin et al. |
| 7,653,304 B2 | 1/2010 | Nozaki et al. |
| 7,658,498 B2 | 2/2010 | Anson |
| 7,834,846 B1 | 11/2010 | Bell |
| 7,869,204 B2 | 1/2011 | Bair et al. |
| 7,901,084 B2 | 3/2011 | Willey et al. |
| 7,925,077 B2 * | 4/2011 | Woodfill et al. .............. 382/154 |
| 7,964,835 B2 | 6/2011 | Olsen et al. |
| 8,044,880 B2 | 10/2011 | Nakamura et al. |
| 2002/0021288 A1 | 2/2002 | Schug |
| 2003/0038927 A1 | 2/2003 | Alden |
| 2003/0086013 A1 | 5/2003 | Aratani |
| 2003/0117343 A1 | 6/2003 | King |
| 2004/0189796 A1 * | 9/2004 | Ho et al. .................. 348/51 |
| 2004/0193413 A1 | 9/2004 | Wilson et al. |
| 2005/0117215 A1 * | 6/2005 | Lange .................. 359/462 |
| 2005/0132408 A1 | 6/2005 | Dahley et al. |
| 2005/0168583 A1 | 8/2005 | Thomason |
| 2005/0182962 A1 | 8/2005 | Given et al. |
| 2005/0237385 A1 * | 10/2005 | Kosaka et al. .................. 348/42 |
| 2005/0280786 A1 | 12/2005 | Moiroux et al. |
| 2006/0125936 A1 * | 6/2006 | Gruhike et al. .......... 348/238 |
| 2006/0140452 A1 | 6/2006 | Raynor et al. |
| 2006/0197843 A1 | 9/2006 | Yoshimatsu |
| 2007/0027580 A1 | 2/2007 | Ligtenberg et al. |
| 2007/0177279 A1 | 8/2007 | Cho et al. |
| 2007/0236485 A1 | 10/2007 | Trepte |
| 2007/0300312 A1 | 12/2007 | Chitsaz et al. |
| 2008/0062164 A1 | 3/2008 | Bassi et al. |
| 2008/0131107 A1 | 6/2008 | Ueno |
| 2008/0158362 A1 | 7/2008 | Butterworth |
| 2008/0191864 A1 | 8/2008 | Wolfson |
| 2009/0008683 A1 | 1/2009 | Nishizawa |
| 2009/0015662 A1 * | 1/2009 | Kim et al. .................. 348/43 |
| 2009/0027337 A1 | 1/2009 | Hildreth |
| 2009/0051797 A1 | 2/2009 | Yao |
| 2009/0079734 A1 * | 3/2009 | McDaniel .................. 345/419 |
| 2009/0115915 A1 | 5/2009 | Steinberg et al. |
| 2009/0116732 A1 * | 5/2009 | Zhou et al. .................. 382/154 |
| 2009/0221368 A1 | 9/2009 | Yen et al. |
| 2009/0262306 A1 | 10/2009 | Quinn et al. |
| 2009/0262343 A1 | 10/2009 | Archibald |
| 2009/0273679 A1 | 11/2009 | Gere et al. |
| 2009/0309826 A1 | 12/2009 | Jung et al. |
| 2010/0060803 A1 | 3/2010 | Slack et al. |
| 2010/0061659 A1 | 3/2010 | Slack et al. |
| 2010/0073499 A1 | 3/2010 | Gere et al. |
| 2010/0079426 A1 | 4/2010 | Pance et al. |
| 2010/0079468 A1 | 4/2010 | Pance et al. |
| 2010/0079653 A1 | 4/2010 | Pance |
| 2010/0079884 A1 | 4/2010 | Gere et al. |
| 2010/0083188 A1 | 4/2010 | Pance et al. |
| 2010/0103172 A1 | 4/2010 | Purdy |
| 2010/0118122 A1 * | 5/2010 | Hartman .................. 348/46 |
| 2010/0309287 A1 * | 12/2010 | Rodriguez .................. 348/43 |
| 2010/0309315 A1 * | 12/2010 | Hogasten et al. ............. 348/164 |
| 2011/0064327 A1 * | 3/2011 | Dagher et al. .............. 382/263 |
| 2011/0075055 A1 | 3/2011 | Bilbrey |
| 2011/0115964 A1 | 5/2011 | Gere |
| 2011/0134224 A1 * | 6/2011 | McClatchie .................. 348/47 |
| 2011/0149094 A1 | 6/2011 | Chen et al. |
| 2011/0242286 A1 * | 10/2011 | Pace et al. .................. 348/47 |
| 2011/0317005 A1 * | 12/2011 | Atkinson .................. 348/135 |
| 2012/0044322 A1 * | 2/2012 | Tian et al. .................. 348/43 |
| 2012/0044328 A1 * | 2/2012 | Gere .................. 348/48 |
| 2012/0050490 A1 * | 3/2012 | Chen et al. .................. 348/47 |
| 2012/0076363 A1 | 3/2012 | Kessler et al. |

FOREIGN PATENT DOCUMENTS

| | | |
|---|---|---|
| JP | 2002354493 | 12/2002 |
| WO | WO93/11631 | 6/1993 |
| WO | WO2007/100057 | 9/2007 |
| WO | WO2009/001512 | 12/2008 |

OTHER PUBLICATIONS

Koschan et al., "Finding Objects in a 3D Environment by Combining Distance Measurement and Color Indexing," IEEE, vol. 1, pp. 858-861, Oct. 2001.

Sokolova et al., "Experiments in Stereo Vision," Computer Science 570, Final Project, http://disparity.wikidot.com/, 14 pages, at least as early as Jun. 16, 2010.

* cited by examiner

SYSTEMS AND METHODS FOR AN IMAGING SYSTEM USING MULTIPLE IMAGE SENSORS

TECHNICAL FIELD

This invention relates generally to an imaging system that uses multiple image sensors to obtain image data, and more specifically to affine transforms and stereo disparity compensation for such an imaging system.

BACKGROUND

The use of separate luma and chroma image sensors, such as cameras, to capture a high quality image is known. In particular, the use of separate luma and chroma image sensors can produce a combined higher quality image when compared to what can be achieved by a single image sensor.

Implementing an imaging system using separate luma and chroma image sensors involves dealing with alignment and disparity issues that result from separate image sensors. Specifically, known approaches deal with epipolar geometry alignment by generating a transform that can be applied to the luma and chroma data obtained by the separate image sensors. Known approaches deal with stereo disparity compensation using a software-based approach. The software-based approach extrapolates from the image data obtained by the luma and chroma image sensors. For example, one approach is to perform edge detection in the image data to determine what disparity compensation to apply. The following review several methods according to the software-based approach: (1) D. Scharstein and R. Szeliski, *A taxonomy and evaluation of dense two-frame stereo compensation algorithms*, International Journal of Computer Vision, 47(1/2/3):7-42, Apr.-Jun. 2002; (2) *Microsoft Research Technical Report MSR-TR-2001-81*, November 2001, each of which is incorporated by reference herein in its entirety.

SUMMARY

The approaches described herein involve a paradigm shift from the known software-based approaches. While the art has been directed to improvements in the software-based approaches, such improvements have not altered the fundamental approach. In particular, the extrapolation from the image data employed by the software-based approaches is not deterministic. As such, situations exist in which the software approaches must guess at how to perform stereo disparity compensation.

For example, in software-based approaches that employ edge detection, an adjustment is made to attempt to compensate for offsets between edges in the chroma image and edges in the luma image. Depending on the image data, such software-based approaches may need to guess as to which way to adjust the edges for alignment. Guesses are needed to deal with any ambiguity in the differences between the luma and chroma image data, such as regarding which edges correspond. The guesses may be made based on certain assumptions, and may introduce artifacts in the composite image obtained from combining the compensated luma and chroma image data.

The paradigm shift described in this disclosure involves a hardware-based approach. A hardware-based approach as described herein does not involve extrapolation, guessing or making determinations on adjustment based on assumptions. Rather, a hardware-based approach as described herein involves a deterministic calculation for stereo disparity compensation, thus avoiding the problem with ambiguity in the differences between the luma and chroma image data in the known software-based approaches.

Various embodiments described herein are directed to imaging systems and methods that employ separate luma, chroma and depth/distance sensors (generally referred to herein as three-dimensional (3-D) image sensors). As used herein, the image sensors may be cameras or any other suitable sensors, detectors, or other devices that are capable of obtaining the particular data, namely, luma data, chroma data and 3-D data. The systems and methods may involve or include both generating an alignment transform for the image sensors, and using the 3-D data from the 3-D image sensor to process disparity compensation. As used herein, imaging systems and methods should be considered to encompass image sensing, capture processing, rendering and/or generating images.

Various embodiments contemplate generating the alignment transform once to calibrate the imaging system and then using the 3-D data obtained in real time to process disparity compensation in real time (for example, once per frame). The calibration may involve feature point extraction and matching and parameter estimation for the alignment transform. In embodiments, the alignment transform may be an affine transform. In embodiments, the affine transform may be applied on every frame for real-time processing. The real-time processing of disparity compensation may be accomplished by using the real-time 3-D data obtained for each respective frame.

In particular, some embodiments may take the form of an imaging system. The imaging system may include: a first image sensor configured to obtain luminance data of a scene; a second image sensor configured to obtain chrominance data of the scene; a third image sensor configured to obtain three-dimensional data of the scene; and an image processor configured to receive the luminance data, the chrominance data and the three-dimensional data and to generate a composite image corresponding to the scene from the luminance data, the chrominance data and the three-dimensional data.

Yet other embodiments may take the form of an imaging method. The imaging method may include: obtaining luminance data of a scene using a first image sensor; obtaining chrominance data of the scene using second image sensor; obtaining three-dimensional data of the scene using a third image sensor; and processing the luminance data, the chrominance data and the three-dimensional data to generate a composite image corresponding to the scene.

Still other embodiments may take the form of a computer readable storage medium. The computer-readable storage medium may include stored instructions that, when executed by a computer, cause the computer to perform any of the various methods described herein and/or any of the functions of the systems disclosed herein.

It should be understood that, although the description is set forth in terms of separate luma and chroma sensors, the systems and methods described herein may be applied to any multiple-sensor imaging system or method. For example, a first RGB (red-green-blue) sensor and a second RGB sensor may be employed. Further, the approaches described herein may be applied in systems that employ an array of sensors, such as an array of cameras. As such, it should be understood that the disparity compensation described herein may be extended to systems employing more than two image sensors.

These and other embodiments and features will be apparent to those of ordinary skill in the art upon reading this disclosure in its entirety, along with the appended claims.

DETAILED DESCRIPTION OF THE INVENTION

Figure 1:
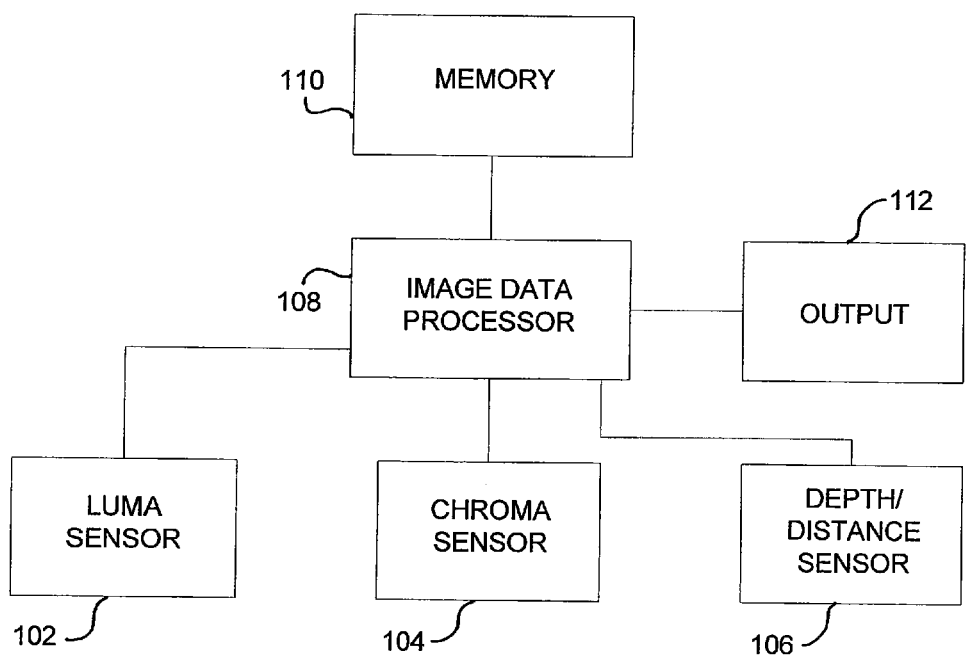
FIG. 1 is a schematic block diagram illustrating an example of an imaging system including three separate sensors.

Imaging systems and methods disclosed herein may provide improved processing speed and/or improved processing quality as compared to conventional systems and methods that employ separate luma and chroma image sensors. In particular, imaging systems and methods disclosed herein may remove ambiguity introduced by conventional approaches for disparity compensation, which are software-based approaches that extrapolate from image data. Further, imaging systems and methods disclosed herein may reduce computational load required to process disparity compensation. According to various embodiments, 3-D data may be gathered in real time for processing disparity compensation in real time.

As used herein, "luma" or "luminance" should be understood in terms of video signals, where luma corresponds to the brightness in an image (e.g., the "black and white" or achromatic portion of the image). Similarly, "chroma" or "chrominance" should be understood in terms of video signals, where chroma corresponds to the color information in an image.

Likewise, as used herein, an "affine transform" or "transformation" should be understood as being a combination of one or more linear transformations (e.g., rotation, scaling or shear) and a translation (i.e., shifting); that is, an affine transformation between two affine spaces consists of a linear transformation followed by a translation. Thus, these terms are used herein in accordance with the accepted meanings as well understood in the art.

As used herein, a "computer-readable storage medium" should be understood to encompass any known or hereafter developed storage device capable or storing instructions that are executable by a computer or similar device. Thus, a computer-readable storage medium should be understood to be a tangible device, such as a floppy disk, a hard disk drive, memory, a jump drive, or the like.

Generally, use of multiple image sensors, such as for luma and chroma data, is known. Thus, it should be understood that any suitable sensor, either known or later developed, may be employed. For example, the image sensors may be cameras, charge-coupled devices (CCDs), CMOS (complementary metal-oxide-semiconductor) image sensors, photodiodes, photoelectric sensors, colorimeters, spectrophotometers, digital microchips, solid-state sensors, color recognition sensors, RGB sensors, infrared sensors (for low light), or the like. In some embodiments, the preferred sensors may be CMOS image sensors, for example, because of they offer best cost/size/performance tradeoffs. Further, color filter arrays (CFAs) may be employed to control the color (light wavelength(s)) collected at each pixel of the image sensors. The CFA for each sensor may be selected for optimal results, for example, for a dual camera system in which one camera employs a chroma only CFA (such as Red-Blue only or color difference Cb Cr for an RGB sensor) and the other camera employs a luma CFA (only bandlimited for luma, but needed for filtering infrared). In some embodiments, identical RGB sensors may be used for collecting chroma and luma data, respectively. Alternatively, an RGB sensor and a luma sensor may be used. Yet another alternative would be an RGB sensor for chroma data and both a luma sensor and an infrared sensor for luma data, which would be particularly suitable for low-light situations.

According to the paradigm shift described in this disclosure, a third sensor for three-dimensional data may be used in combination with sensors for luma and chroma data. Such an approach may be deterministic in that it may be employed to determine alignment and stereo disparity compensation rather than extrapolate or guess.

In general, sensors for sensing three-dimensional data, such as depth, distance or proximity, are known. It should be understood that any suitable sensor, either known or hereafter developed, may be employed to obtain three-dimensional data. For, example, such an image sensor may be based on lidar, radar, 60 Ghz imaging, microchips, infrared time-of-flight (reflected light), infrared triangulation, soundwaves (e.g., acoustic, ultrasonic, sonar, or the like), light emitting diodes (LEDs), or the like.

In some embodiments, a plurality of sensors may be employed for a single type of data. Thus, although particular embodiments described herein refer to a sensor for each data type, it should be understood that arrays of sensors or other multiple sensor arrangements may be employed for each of the data types. Thus, it should be understood that various multiple-image sensor systems may be envisioned, such as using identical image sensors (such as RGB sensors) with different CFAs, one RGB sensor and a luma sensor, infrared sensors used in combination with other image sensors to improve low light imaging, etc.

As will be further understood from the following description, the systems and methods described herein may avoid a need to extrapolate and guess using two-dimensional image data from the luma and chroma sensors, such as using edge detection. The systems and methods may thus avoid any associated ambiguity in the image data, as well as the errors and/or artifacts that software-based extrapolation and guessing can introduce. Thus, in embodiments, the systems and methods described herein may help to reduce errors in disparity compensation and artifacts that such errors can introduce into the composite image (combined luma and chroma image data). In embodiments, the systems and methods described herein may reduce computational load of a processor for computing disparity compensation.

An example of an imaging system 10 including three separate sensors is illustrated by the schematic block diagram of FIG. 1. Specifically, a luma sensor 102, a chroma sensor 104 and a 3-D sensor are shown. For example, the luma sensor 102 may be a CMOS sensor with either a luma CFA or no CFA and an infrared filter. The chroma sensor may be CMOS sensor with a Bayer RGB CFA. As noted above, luma and chroma sensors are described for this example, without limiting the combinations of multiple image sensors that may be employed. The resolution of these sensors may be high-definition (HD) video, 1280×720 pixels or 1920×1080 pixels. However, the resolution of the luma and chroma sensors may be different. Because the human visual system (HVS) is less sensitive to color information, the chroma sensor could be a lower resolution. Also, the pixel size of each sensor may be the same or different, noting that larger pixels are more sensitive to light, but less pixels fit in same area to provide lower resolution. A preferred setup may have larger pixels for color/chroma detection, but have the same sensor area for luma and chroma sensors. In particular, each of the luma sensor 102 and the chroma sensor 104 may be a camera, whether snapshot or video, that incorporates a suitable sensor, such as a CMOS sensor, configured to detect the luma and chroma, respectively, of a scene.

The 3-D sensor may be a depth or distance sensor that is configured to determine depth/distance of points within a scene. In preferred embodiments, the 3-D sensor may be lidar time-of-flight (TOF). However, other embodiments may employ other 3-D sensors that may provide various advantages for a given implementation. Further, the resolution of the 3-D sensor may be lower than the other sensors, if desired. For example, lower sampling for the 3-D data may be acceptable. In such embodiments, the resolution of the 3-D data may be an integer multiple of that of the 3-D sensor to reduce computational complexity. However, in some embodiments it may be desirable to have full resolution (e.g., HD) 3-D data to avoid any artifacts that may be caused by lower resolution 3-D data.

Each sensor/camera 102, 104, 106 may be configure to sense, detect, capture or otherwise obtain only the corresponding data type (luma, chroma or 3-D). As such, each sensor may be specialized or particularly adapted for the particular data type, which may enhance accuracy and/or speed of data acquisition of the particular data type.

Using separate sensors for luma, chroma and 3-D data may allow more information/data to be captured. For example, the capability of a luma sensor need not be limited by also needing to be capable of collecting chroma data, and vice versa. Similarly, neither of the luma and chroma sensors need to be capable of collecting 3-D data when a separate 3-D sensor is used. This is not intended to exclude such a possibility, where a higher quality of image achieved by separate luma and chroma sensors is sufficient for a given application. However, the performance of dedicated sensors for the particular data type (luma, chroma or 3-D) may be greater when separate sensors for all three data types are used. In embodiments, separate sensors may allow for higher resolution (e.g., more pixels) for the luma data, for the chroma data and/or for the 3-D data. Alternatively or additionally, separate sensors may allow the resolution of the sensors to be specifically tailored or optimized for the data type to be collected. Further, alternatively or additionally, separate sensors may allow optics, filtering, and other parameters to be specifically tailored or optimized for the data type to be collected. Also, combining image data from two or more image sensors may improve the signal-to-noise ratio (SNR), thus providing less noise in the image data. Particularly in low-light situations, noise may be a significant problem for collecting image data. Thus, employing an infrared sensor in addition to other image sensors may particularly reduce noise in the image data.

Each sensor 102, 104, 106 may be coupled to or otherwise placed in communication with an image data processor 108 so as to provide respective data to the processor 108. The image data processor 108 may be a central processing unit (CPU) of a general use computer. Alternatively, the processor 108 may be a specially designed processor or other suitable circuitry that is configured to process image data, particularly using separate luma, chroma and 3-D data. Thus, the processor 108 may be implemented as a CPU with various modules and/or applications for performing the image data processing, including, but not limited to computing an affine transform for the image data collected by the luma and chroma sensors 102, 104, computing and applying stereo disparity compensation to the image data, and combining the transformed and compensated image data into a composite image. In some embodiments, custom ASIC (application-specific integrated circuit) hardware may provide desirable cost, power and/or performance. However, programmability is typically limited for ASIC hardware. As such, in some embodiments a general processing unit (GPU) may be desirable, for example, to allow algorithms to be altered as needed or desired.

The image data processor 108 may also be coupled to or otherwise placed in communication with a memory 110 or other storage device, such as a hard drive. The memory 110 may be employed to store the data from the sensors 102, 104, 106, the generated alignment transform, and/or the composite image(s) generated from the data.

Further, the image data processor 108 may be coupled to or otherwise placed in communication with an output device, such as a display screen, a storage device or medium, a universal serial bus (USB) or other port, or the like. The particular output device employed may vary according to a particular application. For example, when video is to be captured and processed, a display screen or monitor may be used in combination with a storage medium or device. The display screen may allow a user to view composite images as they are generated. Alternatively, the display screen may allow the user to view the non-transformed image data from the luma sensor and/or from the chroma camera, and/or may allow the user to view the transformed image data prior to stereo disparity compensation. The storage medium may allow the composite images to be stored, for example, as a video file, for later reproduction and/or transmission, as well as for editing by the user, as appropriate or desired. For example, in one embodiment, processed image data in the form of video may be stored on hard-drive, flash memory or transmitted over network, with final output being on a display for viewing.

Processing and data flow in the system 10 shown in FIG. 1 may be implemented in any suitable manner. As illustrated and described herein, the image data processor 108 may receive luma, chroma and 3-D data from the sensors 102, 104 and 106, respectively. The processor 108 may generate an alignment transform that accounts for differences in the alignment of the sensors 102, 104, 106. An example of generating an alignment transform is discussed below with respect to FIG. 4. Once calibrated for alignment, the system 10 may operate to apply the alignment transform to data sets of luma, chroma and 3-D data, to process the resulting data for stereo disparity compensation, and to generate a composite image from the luma and chroma image data as transformed and compensated. An example of processing for stereo disparity compensation is discussed below with respect to FIG. 6.

As discussed above, a composite image may be generated for a scene or for each frame of a time series of frames, for example, to generate video. Because the composite image or image(s) are based on separate luma and chroma data sources, the generated image/video may be of higher quality as compared to a single image sensor providing both luma and chroma data. In this context, higher quality may be understood as being of higher accuracy (e.g., color and/or brightness), fewer artifacts, higher SNR, better color reproduction, higher resolution, or the like. In particular, using separate luma, chroma, infrared, 3-D and/or other image sensors for the multiple image sensors of the imaging system may allow better filtering of the collected data as compared to filtering a combined data stream, i.e., a single data stream containing all of the image data types being collected. For example, better constraints on the particular image data being collected by each sensor may allow better identification of noise in the particular image data and thus facilitate removal of such noise.

Further, real-time acquisition of 3-D data using the 3-D sensor 106 may allow the image data processor 108 to process disparity compensation in real time. Such processing may require less computation as compared to known methods. Also, such processing may avoid errors/inaccuracy that occur with processing techniques that are software-based and use extrapolations from the luma and chroma image data. Thus, various embodiments may further enhance the quality of images that are generated by the system 10.

Figure 2:
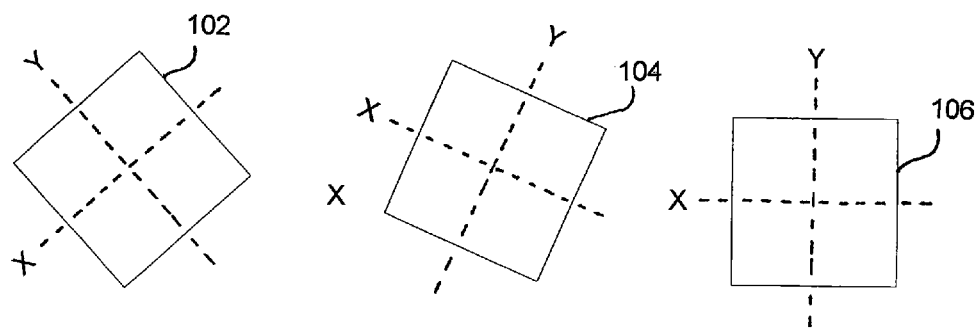
FIG. 2 is a schematic representation of non-alignment of the three sensors.

As discussed above, the generated alignment transform may account for or compensated for differences in alignment of the sensors 102, 104, 106. FIG. 2 is a schematic representation of non-alignment of the luma, chroma and 3-D sensors 102, 104, 106. The non-alignment may be in terms of rotation and translation, for example, such that the sensors 102, 104, 106 are shifted relative to each other in one or more directions (translation), and the axes (x, y; x', y'; x", y") are offset (rotation) relative to each other. It should be understood that the non-alignment illustrated in FIG. 2 is exaggerated for clarity and understanding. The non-alignment in practice may be relatively small, for example, based on manufacturing tolerances of the sensors 102, 104, 106 and/or the structure(s) in which they are incorporated. Further, it should be understood that the non-alignment may be in any suitable terms that permit mathematical calculation of a suitable transform that improves or corrects alignment or registration of the sensors.

Figure 3:
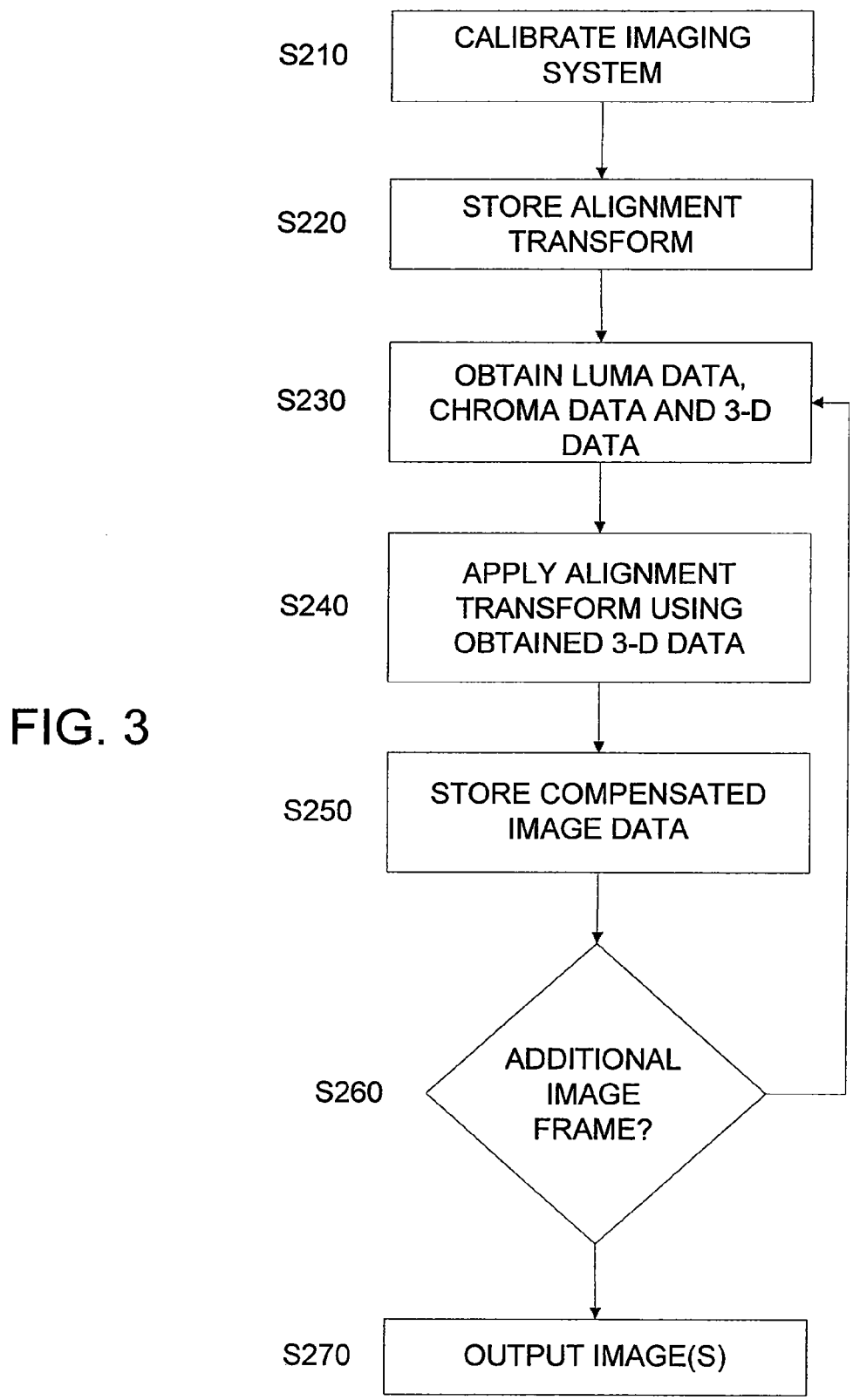
FIG. 3 is a flowchart illustrating an example of a method of imaging using the three sensors.

FIG. 3 is a flowchart illustrating an example of a method of imaging using the luma, chroma and 3-D cameras 102, 104, 106. Operation may begin at S210, where the imaging system may be calibrated. As discussed above, calibration of the imaging system may involve generating an alignment transform to account for differences in positioning and/or orientation of the luma, chroma and 3-D sensors. Alternatively, calibration of the imaging system may involve generating an alignment transform to account for differences in positioning and/or orientation of only the luma and chroma sensors. In either case, the calibration of the system may be a one-time event, as appropriate or desired. Additional details regarding generation of the alignment transform are discussed below with respect to FIG. 4.

Operation may continue to S220, where the alignment transform may be stored for later use. For example, as discussed above, the alignment transform may be stored in memory or any other suitable storage device (such as flash or one-time writable memory or ROM). Thus, it should be understood that the operations at S210 and S220 may be performed one time, such as at the time the imaging system is fabricated. Once the system is calibrated, operation may continue to S230, where data collection may be performed. Specifically, the luma, chroma and 3-D sensors may collect the respective data from a particular scene or a particular frame of a series of frames of a scene.

Next, at S240, the alignment transform may be applied to the luma and chroma data for a given scene or frame and stereo disparity compensation may be applied to the luma and/or chroma data per pixel, based on the corresponding 3-D data. As discussed above, the 3-D data may be obtained in real time to allow for real-time stereo disparity compensation. Once disparity compensation has been applied to the luma and chroma data, operation may continue to S250, where the luma and chroma data may be combined to form compensated, composite image data, which may be stored for later use, reproduction, transmission, or the like.

Next, a determination may be made at S260 as to whether an additional image frame or scene is to be processed. This may be for an unrelated image frame/scene or may be for a subsequent image frame in a time series of image frames to be captured. If an addition image frame/scene is to be processed, operation may return to S230 to obtain the luma, chroma and 3-D data for that image frame/scene.

The loop defined by S230 through S260 may continue until no more image frames/scenes are to be processed. Once that is the case, operation may continue to S270, where one or more images may be output. It should be understood that any suitable form of output may be performed at S270. For example, individual images may be output to a display device for viewing, to a storage device, to a printing device, or to a recording device for recording on a medium. Alternatively, images of a series may be output and stored at S250, with the series of images corresponding to a slide show or video, as appropriate or desired. In general, the image(s) may be stored for subsequent processing, such as for disparity compensation.

Figure 4:
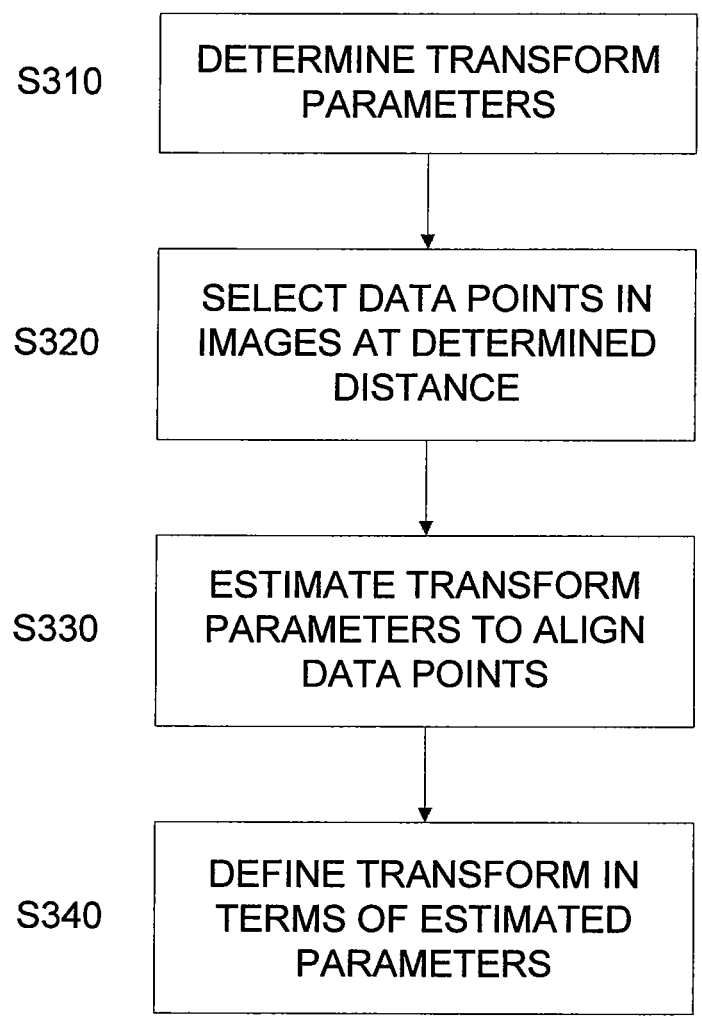
FIG. 4 is a flowchart illustrating an example of a method of generating an alignment transform.

An example of a method of generating an alignment transform for the luma and chroma sensors is illustrated in the flowchart of FIG. 4. It should be understood that this is only one method that may be employed to carry out the calibration at S210 in FIG. 3. In particular, it should be understood that the alignment transform may be extended to include the 3-D sensor to account for non-alignment of the 3-D sensor relative to the luma and chroma sensors. Also, the alignment transform may also take into account any difference in resolution between the different sensors, as such a difference alters the mapping of pixels from a one-to-one correspondence. Further, it should be understood that the affine parameters may include rotation and translation, without shear or scaling according to some embodiments, as described below.

Operation may begin at S310, where parameters for the affine transform may be determined. In this example, the affine transform parameters selected are rotation and two-dimensional translation (i.e., vertical and horizontal). By selecting rotation and vertical and horizontal translation, one can achieve an alignment between horizontal lines of the luma and chroma images by applying the generated transform. It should be understood, however, that alternative or additional affine transform parameters may be selected, such as scaling, shear, or the like, as may be appropriate or desired for a given application. It should be understood that other approaches to alignment of the multiple image sensors of the imaging system may be employed. For example, alignment issues may be reduced or even avoided, for example, by using imaging sensors formed from the same silicon die. In such a case, the multiple image sensors are constructed from the same process and alignment may be to a sub-micron scale, so no additional alignment may be necessary. This may only be possible for certain image sensors, such as luma and chroma sensors that may be of a similar construction. In such case, alignment of the 3-D sensor with the other image sensors would still be required.

Figure 5:
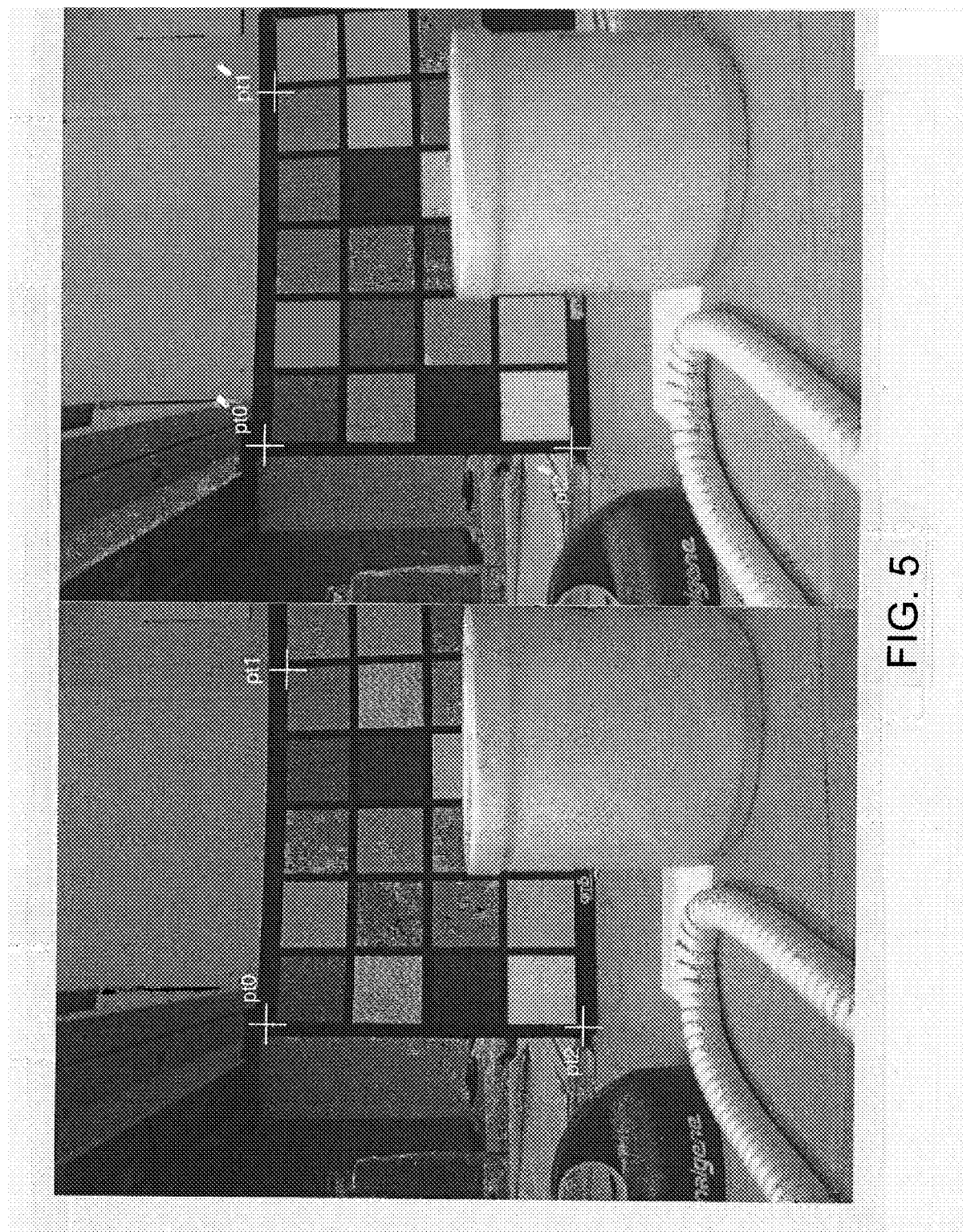
FIG. 5 is an example of side-by-side luma and chroma image data for the same scene prior to generation and application of the alignment transform.

Operation may continue to S320, where data points in the luma and chroma images are selected. As illustrated in FIG. 5, with an image from a luma sensor on the left and a corresponding image from a chroma sensor on the right, data points pt0, pt1 and pt2 are identified in the luma image and corresponding data points pt0', pt1' and pt2' are identified in the chroma image. The data points may be selected at a desired distance from the image sensors. For example, the desired distance may be a typical viewing distance, such as between thirty and sixty centimeters, for a user viewing a computer screen for video conferencing via personal computer. In such case, the typical viewing distance may correspond to the typical distance the user is from their webcam. In some embodiments, data point extraction may be automated, for example, by using a chart with specific known features or other predetermined image for the scene.

In practice, the distance selected for the data points may be a focal length of the luma and chroma sensors, or an average of their focal lengths. In other words, the luma and chroma sensors may have a primary focal length for which they are designed. In such case, selecting the distance based on the focal length may help to ensure that the alignment transform is well-suited to the specific imaging system, providing the best (e.g., most accurate, least artifacts, etc.) transformation at the focal length the imaging system is designed to operate. It should be understood that the calibration distance will determine the distance at which the two image sensor are perfectly aligned. At that distance, no stereo disparity compensation may be required. Objects closer or farther will require such compensation. In general, the alignment distance may be the typical distance for the scene. For example, this distance may be a known distance (e.g., 30-60 cm) for video conferencing. In a digital camera, however, a given scene may be analyzed to determine the optimal distance based on the objects in the scene. As such, a particular set of calibration data may be used for the given scene. Thus, it may be useful to store calibration for various distances.

While three data points are selected in this example, it should be understood that any suitable number of data points may be selected, as appropriate or desired for a particular implementation. For example, a minimum number of data points may be needed to perform the calibration to a desired degree of accuracy and/or for a desired combination of transform parameters. For example, a minimum of three data points may be needed for rotation, translation and scaling, whereas a minimum of four data points may be needed for rotation, translation and shear. In any case, however, it should be understood that more data points may be used to achieve a desired accuracy in the calibration.

The difference between the locations of the data points pt0, pt1 and pt2 and the corresponding data points pt0', pt1' and pt2' in the respective images may be used to estimate the desired parameters of the affine transform. Specifically, the parameter values needed to align the corresponding data points pt0', pt1' and pt2' with the data points pt0, pt1 and pt2 can be calculated. In this example, an amount of rotation and an amount of translation may be determined to align the respective data points. Thus, at S340, the affine transform may be defined in terms of the estimated/calculated parameter values.

It should be understood that the affine transform may be generated for either the luma data or the chroma data. In other words, the generated affine transform may be applied to one or the other of the luma and chroma data to provide alignment between the images. In this example, it may be preferable to apply the transform to the chroma data only because the transform may reduce details in the data and chroma data is less sensitive to details as compared to luma data. In other words, the transform may be applied to data based on sensitivity to details which may be lost or reduced by application of the transform.

It should also be understood that another affine transform may be generated to align the 3-D sensor with the luma sensor or the chroma sensor. Alternatively, a first affine transform may be generated to align the luma sensor with the 3-D sensor and a second affine transform may be generated to align the chroma sensor with the 3-D sensor. However, where the distance between the sensors is known, only one calibration set of parameters may be required for generating a 3-D to luma transform and a chroma to luma transform.

In any case the alignment transform(s) may be stored for later use. For example, as discussed above, the alignment transform may be stored in memory or any other suitable storage device. The generation of affine transform(s) may be a one-time determination for the image sensors when the image sensors are fixed in relation to one another. Alternatively, when the image sensors are movable to any significant degree, a recalibration (i.e., recalculation of affine transform(s)) may be appropriate. Thus, it should be understood that the description herein of applying the affine transform(s) to the corresponding sensor data for each frame is not meant to exclude such recalibration, as appropriate or desired.

Figure 6:
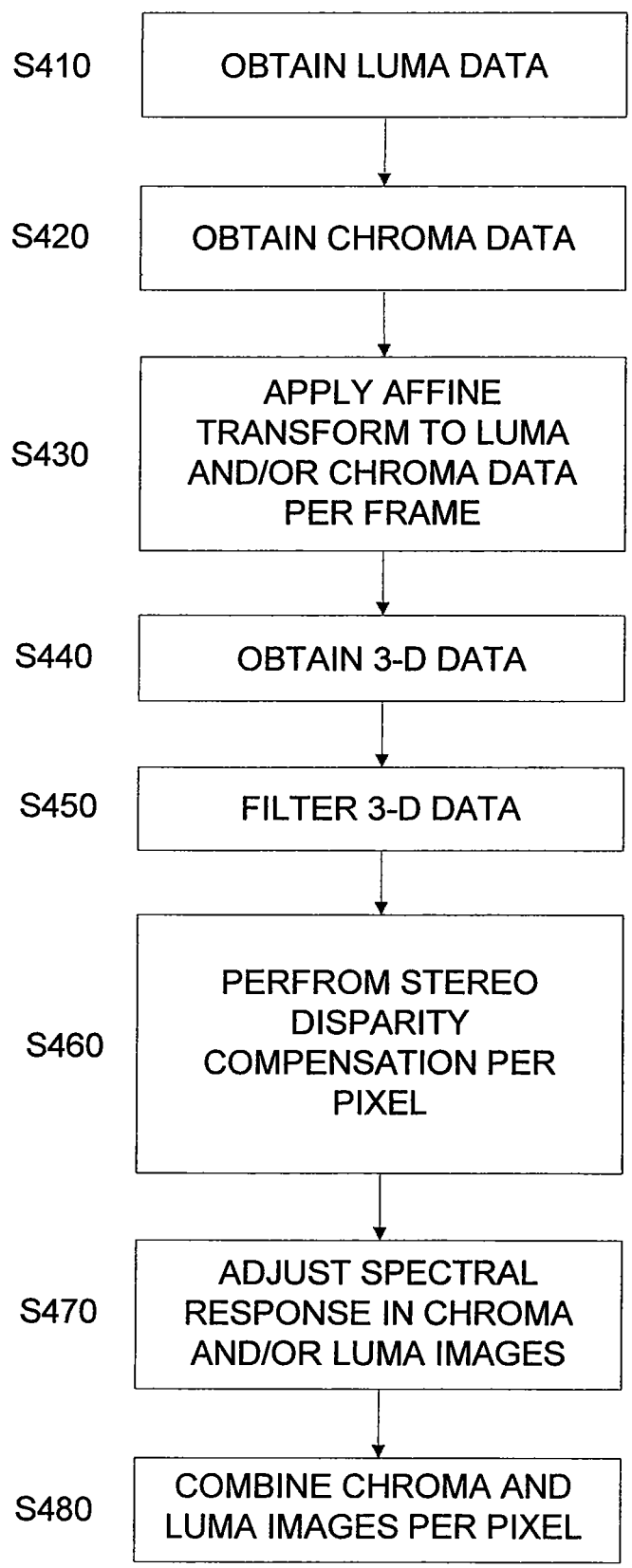
FIG. 6 is a flowchart illustrating an example of a method of performing stereo disparity compensation as part of an imaging process.

Once the system is calibrated, the imaging system may be ready to perform data collection to obtain a composite image, i.e., a combination of luma data and chroma data as aligned and compensated for stereo disparity. One example of such a process including disparity compensation using 3-D data from the 3-D sensor is illustrated in the flowchart of FIG. 6. It should be understood that this is only one method that may be employed, and is not exhaustive of the methods that may implement the concepts described herein.

Operation may begin at S410, where luma data is collected using one or more luma sensors. Operation may continue to S420, where chroma data is collected using one or more chroma sensors. It should be understood that the operations at S410 and S420 may be performed simultaneously, concurrently or in reverse order from that shown.

Next, having determined the affine transform as discussed above with respect to FIGS. 4 and 5, for example, the affine transform may be applied to either the luma data or the chroma data on a per frame basis to align the luma and chroma data. As discussed above, the affine transform may be applied to the chroma data, but not the luma data in a preferred embodiment.

At S440, 3-D data is collected using one or more sensors. As discussed above, such sensor(s) may be a distance sensor, a depth sensor, a proximity sensor, or the like configured to detect 3-D data of a scene. As appropriate or desired, the 3-D data collected may be filtered, for example, to reduce noise in the 3-D data. For example, because it is understood that depth information should follow boundaries of objects in the image, such information may be used to filter the 3-D data. A simple approach may be to apply a low pass filter to the 3-D data. Although not shown, it should be understood that the luma data and/or the chroma data may also be filtered, as appropriate or desired.

In some embodiments, known or hereafter developed software-based approaches may be used in combination with the hardware-based approach described herein. For example, software analysis of the luma and chroma data may be used to validate and/or confirm the 3-D data collected by the 3-D sensor, and may also be used to reduce noise from the 3-D data.

After or as the 3-D data is obtained, stereo disparity compensation may be applied to the luma data or the chroma data on a per pixel basis, i.e., independently per pixel. Based on the 3-D data for a particular pixel, that pixel in the luma or chroma data may be shifted to be further aligned with the corresponding pixel in the other of the luma or chroma data. An amount of shift (translation) for each pixel may be determined from the 3-D data (e.g., depth) for the particular pixel because the amount of shift is proportional to the 3-D data (e.g., depth). In this example where the affine transform has been applied so that rotational and vertical alignment is achieved, the stereo disparity compensation may be a horizontal shift. The degree of shift based on 3-D data may be determined experimentally for a given imaging system, and is dependent on the distance between the sensors. In general, the shift or translation may be vertical and/or horizontal, depending on the orientation of the two image sensors. For example, the image sensors may be placed side-by-side (horizontal displacement) or on top of each other (vertical displacement), or both.

Once the stereo disparity compensation has been performed for all pixels in the luma or chroma data for the frame being processed, operation may continue to S470 where the spectral response in the chroma image data and/or in the luma image data may be adjusted. This may be performed so that the color of "Y" in the luma image data and in the chroma image data match. In other words, it may be desirable to match the spectral response because the CFA used for the luma sensor(s) and the CFA used for the chroma sensor(s) may be different. The desired brightness response is light wavelength dependent, so that adjustment may be needed to account for such dependence.

After the alignment, stereo disparity compensation and any spectral adjustments are made to the luma data and/or the chroma data, operation continues to S480 where the luma and chroma data are combined to generate a composite image. This is performed by combining the pixels at the same locations in the image data, as adjusted for alignment and stereo disparity. The resulting high quality image may then be output in any desired manner, such as for viewing, storage, transmission, or the like, as appropriate or desired.

It should be understood that the block diagram of FIG. 1, the illustration of FIG. 2 and the flowcharts of FIGS. 3, 4 and 6 are intended only to be illustrative. As will be understood from the foregoing, various methods may be envisioned for image processing. Also, it should be understood that details of the system 10 not specifically discussed herein may be implemented in any suitable manner, such as conventional and well known in the art.

The foregoing merely illustrates certain principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles disclosed in this document and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

The invention claimed is:

1. An imaging system, comprising:
    a first image sensor configured to obtain luminance data of a scene;
    a second image sensor configured to obtain chrominance data of the scene;
    a third image sensor configured to obtain three-dimensional data of the scene; and
    an image processor configured to receive the luminance data, the chrominance data and the three-dimensional data and to generate a composite image corresponding to the scene from the luminance data, the chrominance data and the three-dimensional data;
    wherein the processor is configured to:
        generate an alignment transform that accounts for differences in alignment of the first, second and third image sensors;
        generate the alignment transform as a calibration of the system and thereafter to apply the alignment transform to provide epipolar geometry alignment and disparity compensation; and
        process the disparity compensation in real time using the three-dimensional data received in real time wherein the three-dimensional data includes at least one of distance data of the scene or depth data of the scene.

2. The system of claim 1, wherein the first image sensor is configured to obtain only the luminance data, the second image sensor is configured to obtain only the chrominance data, and the third image sensor is configured to obtain only the three-dimensional data.

3. The system of claim 2, wherein the first image sensor comprises an infrared sensor.

4. The system of claim 2, further comprising an infrared sensor configured to obtain only luminance data.

5. The system of claim 1, wherein the third image sensor comprises lidar.

6. The system of claim 1, wherein the third image sensor is an acoustic sensor.

7. The system of claim 1, wherein the processor is configured to apply the alignment transform to provide epipolar geometry alignment and disparity compensation for each frame of a time series of frames of the scene.

8. An imaging method, comprising:
    obtaining luminance data of a scene using a first image sensor;
    obtaining chrominance data of the scene using a second image sensor;
    obtaining three-dimensional data of the scene using a third image sensor;
    processing the luminance data, the chrominance data and the three-dimensional data to generate a composite image corresponding to the scene;
    generating an alignment transform that accounts for differences in alignment of the first, second and third image sensors wherein generating the alignment transform comprises a calibration; and
    applying the alignment transform after the calibration to provide epipolar geometry alignment and disparity compensation wherein applying the alignment transform comprises processing the disparity compensation in real time using the three-dimensional data received in real time wherein the three-dimensional data includes at least one of distance data of the scene or depth data of the scene.

9. The method of claim 8, wherein only the luminance data type is obtained using the first image sensor, only the chrominance data type is obtained using the second image sensor, and only three-dimensional data is obtained using the third image sensor.

10. The method of claim 8, wherein the first image sensor comprises an infrared sensor.

11. The method of claim 9, wherein obtaining the luminance data, the second chrominance data and the three-dimensional data of the scene comprises obtaining such data for each frame of a time series of frames of the scene, and applying the alignment transform provides epipolar geometry alignment and disparity compensation for each frame of the time series of frames.

12. A non-transitory computer-readable storage medium including stored instructions that, when executed by a computer, cause the computer to:

obtain luminance data of a scene;
obtain chrominance data of of the scene;
obtain three-dimensional data of the scene;
process the luminance data, the chrominance data and the three-dimensional data to generate a composite image corresponding to the scene;
generate an alignment transform that accounts for differences in alignment of the first, second and third image sensors wherein generating the alignment transform comprises a calibration; and
apply the alignment transform after the calibration to provide epipolar geometry alignment and disparity compensation wherein applying the alignment transform comprises processing the disparity compensation in real time using the three-dimensional data received in real time wherein the three-dimensional data includes at least one of distance data of the scene or depth data of the scene.

13. The medium of claim 12, wherein the stored instructions, when executed by the computer, cause the computer to separately obtain the luminance data, the chrominance data, and the three-dimensional data.

14. The medium of claim 12, wherein the stored instructions, when executed by the computer, cause the computer to:
obtain the luminance data, the chrominance data and the three-dimensional data of the scene for each frame of a time series of frames of the scene; and
apply the alignment transform to provide epipolar geometry alignment and disparity compensation for each frame of the time series of frames.

* * * * *